United States Patent [19]

Rajchman

[11] 4,051,468
[45] Sept. 27, 1977

[54] APPARATUS AND METHOD FOR MODULATING A FLAT PANEL DISPLAY DEVICE

[75] Inventor: Jan Aleksander Rajchman, Princeton, N.J.

[73] Assignee: RCA Corporation, New York, N.Y.

[21] Appl. No.: 709,411

[22] Filed: July 28, 1976

[51] Int. Cl.² .............................................. G06F 3/14
[52] U.S. Cl. ..................... 340/324 M; 250/213 VT; 313/103 CM; 328/243; 340/343
[58] Field of Search .............. 340/324 M, 324 R, 343, 340/166 EL; 250/213 VT; 328/241-243; 313/103 CM, 105 CM

[56] References Cited

U.S. PATENT DOCUMENTS

| | | | |
|---|---|---|---|
| 3,408,532 | 10/1968 | Hultberg | 313/105 CM |
| 3,825,922 | 7/1974 | Ralph | 313/103 CM |
| 3,864,595 | 2/1975 | Lawrence et al. | 250/213 VT |
| 3,944,817 | 3/1976 | Hilsum | 250/213 VT |
| 3,980,880 | 9/1976 | D'Agostino | 250/213 VT |

Primary Examiner—Marshall M. Curtis
Attorney, Agent, or Firm—Glenn H. Bruestle; George E. Haas

[57] ABSTRACT

A flat panel display device has a cathodoluminescent screen which is bombarded by a flow of electrons. The screen becomes electrically charged due to the electron bombardment. The charge striking various points on the screen is directly related to the image brightness at those points. The flow of electrons to each point is modulated by sensing the electrical charge which strikes the screen's surface at each point and comparing it to the image brightness signal for the display. When a predetermined relationship between the charge and the signal exists, indicating that the proper brightness level has been reached, the electron flow is terminated. The sensing system may be multiplexed to reduce its complexity.

21 Claims, 8 Drawing Figures

APPARATUS AND METHOD FOR MODULATING A FLAT PANEL DISPLAY DEVICE

BACKGROUND OF THE INVENTION

The present invention relates to large area, flat cathodoluminescent image display devices; and particularly to apparatus for modulating such display devices.

Flat large area cathodoluminescent display devices have been suggested for use in image displays, such as television. These devices may have a matrix of individually addressable electron sources formed by electron multipliers operating in a regenerative feedback mode. Such devices have a cathode at one end of an electron multiplier and a cathodoluminescent screen at the other end. The electrons from the cathode enter the multiplier which amplifies the electron flow. Modulating, focusing and accelerating electrodes are between the multiplier and the screen to shape the electron beam and accelerate it toward the screen. The screen is coated with phosphor material which emits light upon electron bombardment. The output of the electron multiplier also generates a feedback species, such as positive ions. These positive ions in the display device travel back to and strike the cathode emitting secondary electrons and completing a feedback loop so as to allow sustained electron emission.

The individual electron sources for the display device are intrinsically nonuniform in their output because of unavoidable variations in the multiplier dimensions and secondary emission properties. Therefore, the light output from the phosphor material may vary from one area of the screen to another. In addition, the flow of electrons from each multiplier must be modulated to provide the proper brightness for the corresponding picture element. Therefore, a means of unifying and modulating the output of the electron sources is required if such display devices are to be utilized for image display applications, such as television, where a high degree of uniformity and gray scale control are required.

SUMMARY OF THE INVENTION

A modulation control for a flat panel display device having a cathodoluminescent screen comprises means for sensing the electrical charge impinging on the screen. The sensed charge is then employed to control the flow of electrons to the screen and in turn the image brightness. This control regulates the modulation of the various picture elements in the display and eliminates unwanted nonuniformity in the output of the electron sources.

DETAILED DESCRIPTION OF THE INVENTION

Figure 1:
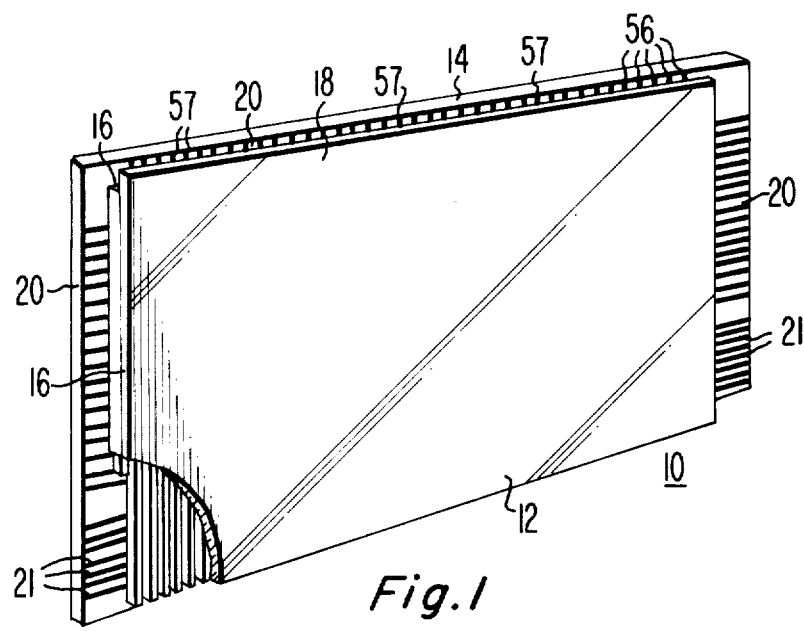
FIG. 1 is a flat image display device according to the present invention.

With initial reference to FIG. 1, a large area image display device, generally designated as 10, has an envelope with a faceplate 12 and a rear panel 14 connected by four sidewalls 16, all of which may be made of glass. The rear panel extends beyond the walls 16 forming terminal areas 20 having a plurality of electrical terminals 21, 56 and 57 thereon. The faceplate 12 extends beyond the sidewall 16 at the top of the device forming an overhang 18. The interior surface 22 of the overhang 18 has five electrical contacts 46 on it, as shown in FIG. 3.

Figure 2:
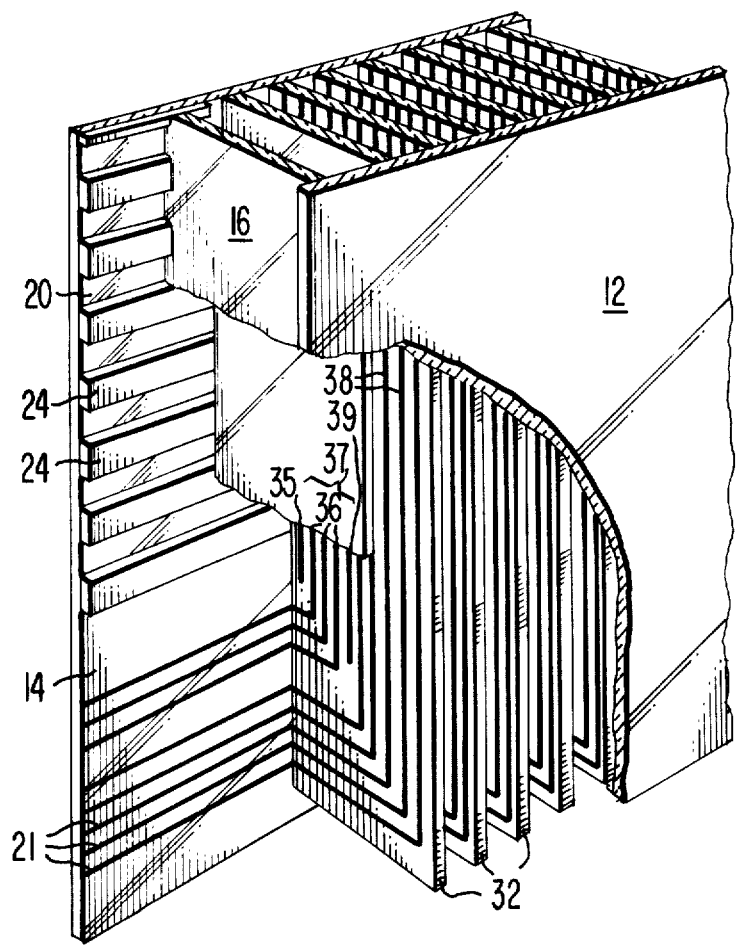
FIG. 2 is an enlargement of the cut-away section of FIG. 1.

With reference to FIG. 2, a plurality of parallel cathode stripes 24 of ion secondary electron emissive material, preferably MgO, are on the interior surface of the rear panel 14. Extending between the faceplate 12 and the rear panel 14 are a plurality of spaced parallel vanes 32 orthogonal to the cathode stripes 24. A plurality of electrodes 35, 36, 38 and 39 are on both surfaces of each vane 32. The first electrode 35 is an address electrode and the next three electrodes 36 on each vane surface, form the dynode chain of a conventional electron multiplier 37 which is formed between adjacent vanes 32. On both sides of each vane 32, between the electron multiplier 37 and the faceplate 12, are a plurality of accelerating and modulating electrodes 38 and 39. The modulating electrodes 39 form electron shutters which permit or inhibit electron flow depending on the applied bias voltage.

Figure 3:
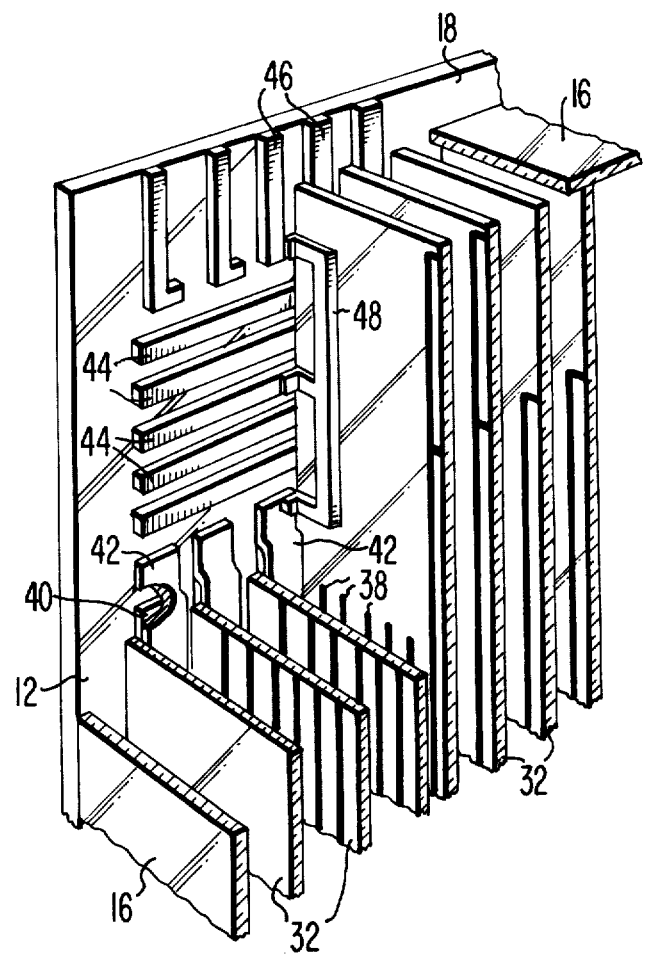
FIG. 3 is a cut-away sectional view of a portion of the image display.

A plurality of phosphor stripes 40 are on the interior surface of the faceplate 12 forming the viewing screen of the device (FIG. 3). Although only one phosphor stripe 40 is shown between each pair of adjacent vanes 32, more than one stripe can be between each pair of adjacent vanes. A thin metal anode electrode stripe 42 extends over each of the phosphor stripes 40. Each of the anode electrodes 42 is sequentially connected to one of five anode buses 44 so that every fifth anode electrode is bussed in common. Variations of the present invention may use more or fewer buses. If X buses are used, then every Xth anode electrode is connected in common and each bus has a group of Y anode electrodes connected to it, wherein X times Y equals the total number of anode electrodes, M. Each anode bus 44 is connected to an external anode terminal 46 by a conductive strip 48 on a vane 32.

Figure 4:
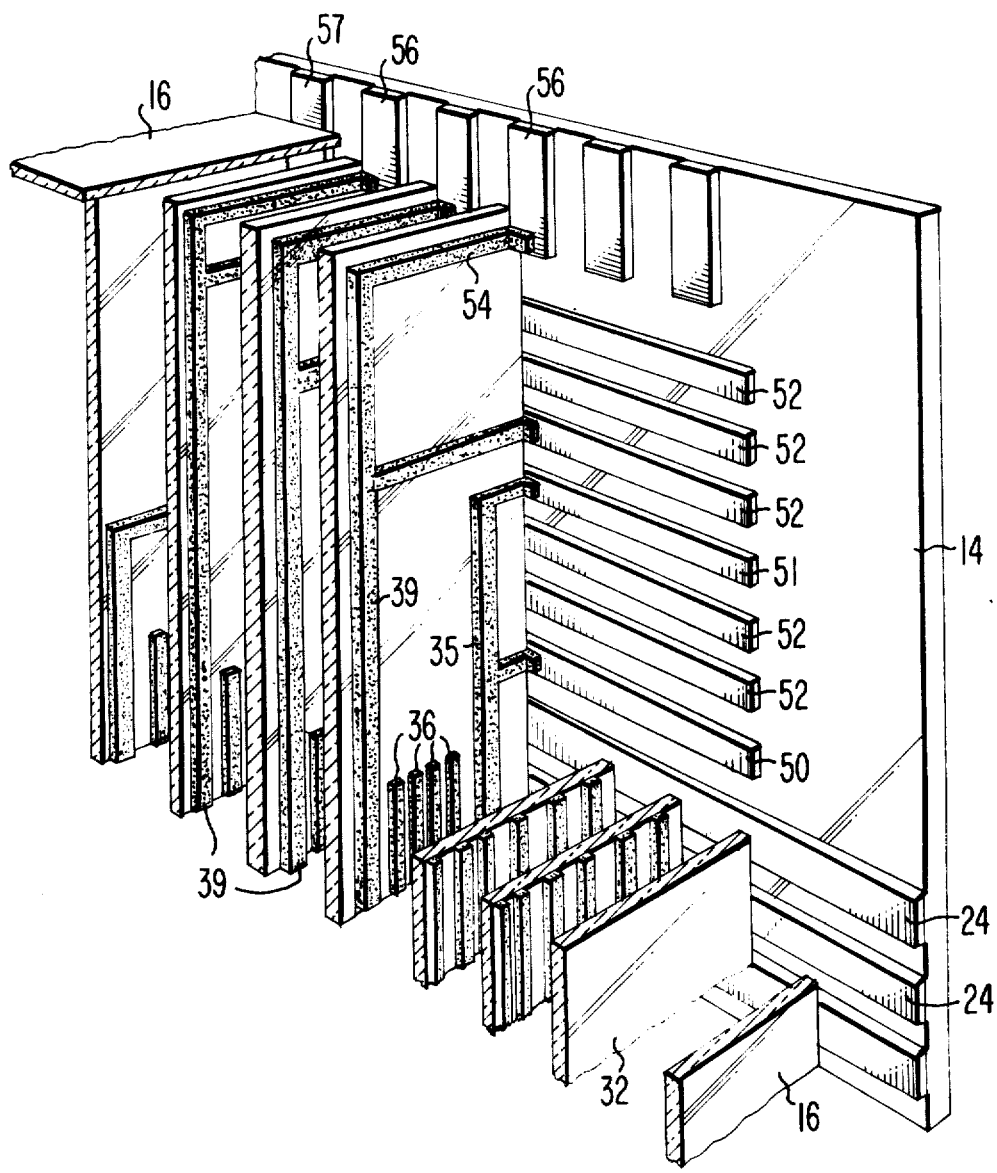
FIG. 4 is a cut-away sectional view of another portion of the present image display.
Figure 5:
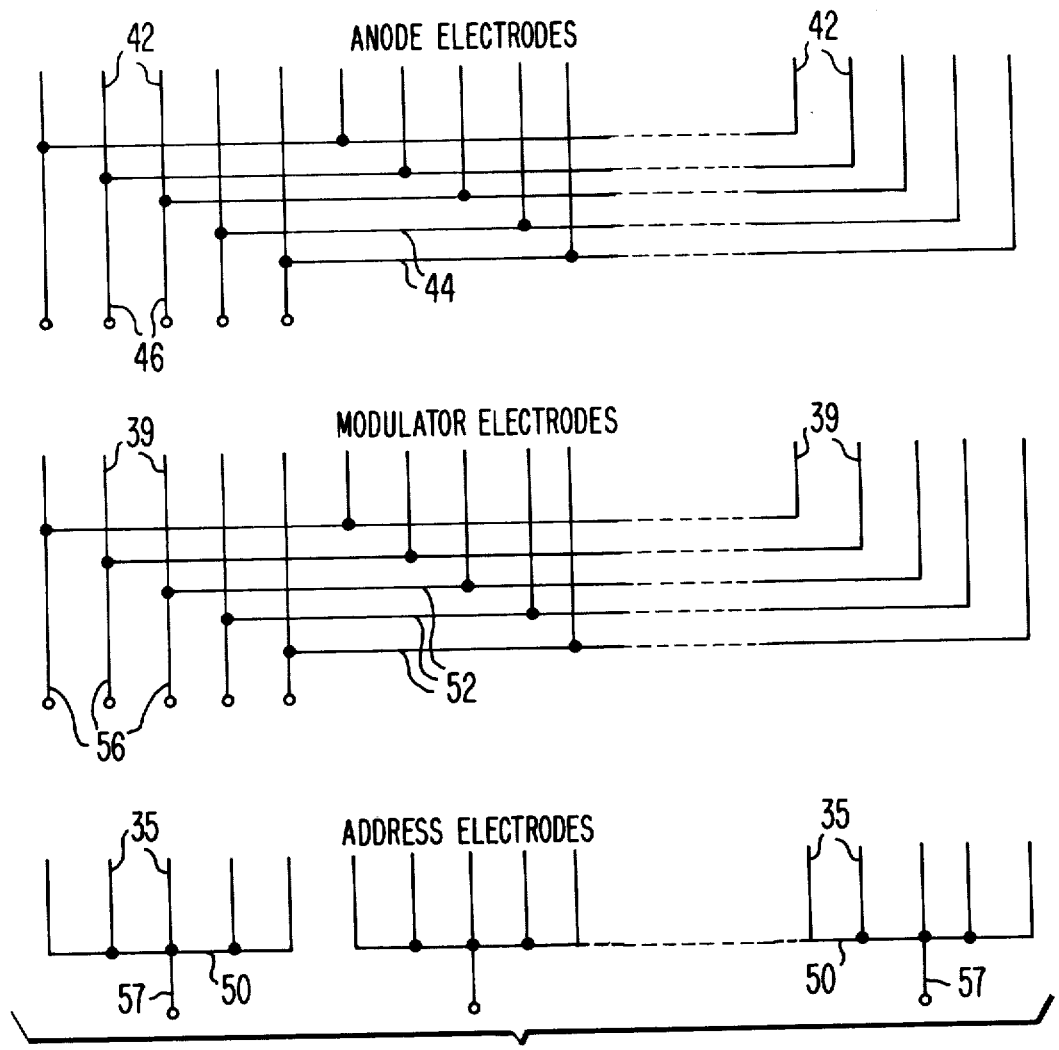
FIG. 5 is a diagram of a multiplexing system for the control circuits in the present invention.

As shown in FIGS. 4 and 5, the address electrodes 35 of the first five (X) adjacent multipliers are connected in common by an address bus 50, which is connected to one of the terminals 57 by a second address bus 51 and a conductor on the unseen side of one of the vanes 32. In a similar manner, other quintets of adjacent multiplier address electrodes 35 are bussed in common. There are a total of M address electrodes bussed into Y groups of X electrodes. There are M modulator electrodes 39 sequentially connected to one of the five modulator buses 52 so that every fifth modulator electrode 39 is bussed in common. Therefore, Y modulator electrodes 39 are connected to each modulator bus 52. The number of modulator buses 52 may vary as long as that number equals the number (X) of anode buses 44. Each modulator bus 52 is connected to a different terminal strip 56 at one end of the top terminal area 20 by a conductor 54. The present structure employs the various buses to multiplex the individual electron multipliers 37, the modulator electrodes 39 and the anode electrodes 42 into groups of five. Each of the modulator electrodes 39 is associated with one of the address electrodes 35. The two sets of electrodes are bussed so that no group of commonly connected address electrodes has more than one electrode associated with an electrode in each group of bussed modulator electrodes.

Figure 6:
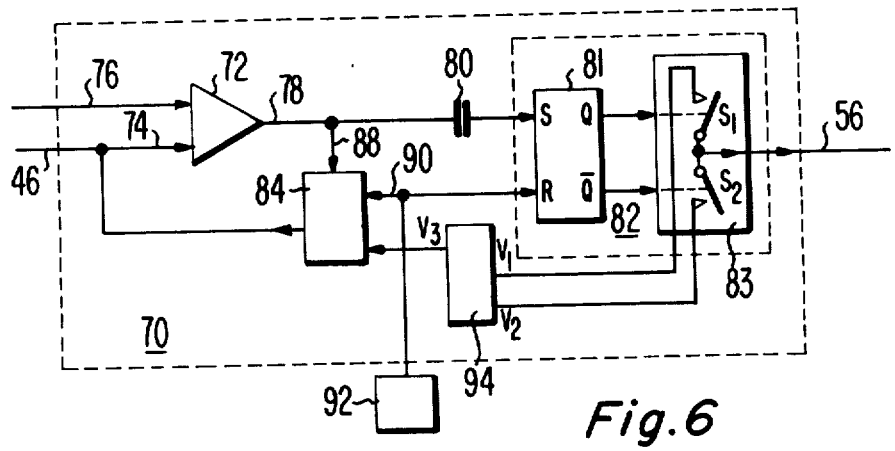
FIG. 6 is a control circuit for modulating the image display of the present invention.

The electron flow is controlled by a modulation control circuit 70, as shown in FIG. 6 which is connected to one set of modulator and anode terminals 56 and 46 respectively. There are five such control circuits 70 for the display device of the present embodiment. A typical control circuit 70 may comprise a voltage comparator 72 having a first input 74 connected to one of the anode electrode terminals 46 and a second input 76 connected to the image brightness signal for the display. The image brightness signal is that portion of the composite image signal which contains the brightness information for each element of the display image. The signal voltage varies in proportion to the desired element brightness.

A modulator control switch 82 comprises a flip-flop 81 and a double switch circuit 83 which may be two transistor switches. The output 78 of comparator 72 is connected to the set input of the flip-flop 81 by means of a high voltage capacitor 80. The reset terminal of the flip-flop 81 is connected to an external clock 92. The outputs of the flip-flop, Q and $\bar{Q}$, trigger a different switch in the double switch circuit 83. The double switch circuit 83 switches one of two modulator bias voltages, $V_1$ or $V_2$, from a voltage supply 94 to one of the modulator electrode terminals 56. An anode reset switch 84 is similar to the modulator control switch 82 and connects a single anode bias voltage $V_3$, from the power supply to an anode electrode terminal 46. The set and reset terminals 88 and 90 of the anode switch 84 are connected to the clock 92 and the output 78 of the comparator 72.

For ease of understanding, the operation and control of a single image element will be described initially. Each cathode stripe 24 corresponds to a line of display elements which is addressed by biasing the cathode stripe 24 to emit electrons. A particular element along the line may be addressed by activating the corresponding electron multiplier 37 to permit the electrons from the cathode stripe 24 to enter the multiplier 37. This is accomplished by biasing the multiplier's address electrode 35 positive with respect to the cathode stripe 24 which is activated. The electron current is amplified by the multiplier 37 producing a large current at the multiplier output. This electron current also generates a feedback species, such as gas ions, which travel back to the cathode causing sustained electron emission. The output of the feedback electron multiplier 37 flows through the modulating electrodes 39, the accelerating and focusing electrodes 38 finally striking the anode electrodes 42 and the phosphor stripes 40 on the faceplate screen 12. By properly biasing certain of the address electrodes 35 along the activated cathode stripe 24, specific elements along a line on the faceplate of the display may be electron bombarded.

Each element along the line is controlled by a modulator control circuit 70 so that the picture element brightness corresponds to the image element brightness signal regardless of variations in electron multiplication or multiplier current output. As the electrons strike the anode electrode 42 and penetrate the underlying phosphor stripe 40, a charge builds up on the anode electrode 42 which is distributed by the anode bus 44 to the other common anodes. By carefully controlling the dimensions of each of the anode electrodes 42 and their spacing from one another, the capacitance between the commonly bussed anode electrodes and other electrodes in the device will be constant and uniform for all the commonly bussed anode electrodes. Therefore, by sensing the anode electrode voltage, the incident charge on the anode electrode also may be sensed, since $$V = (Q/C)$$

where $V$ is the voltage between the commonly bussed anode stripes and a reference point, such as ground, $Q$ is the charge on the anode stripes and $C$ is the capacitance between the anode stripes and the other electrodes. For a constant capacitance, the voltage will be proportional to the charge and directly related to the element's brightness.

This voltage from the anode electrode is compared to a brightness signal voltage for that particular image element by the voltage comparator 72. When a predetermined relationship between the two voltages, such as equality, has been reached; the comparator 72 generates an output signal. The output from the comparator 72 travels through the capacitor 80 to the modulator switch circuit 82. Up until this point, the modulator switch circuit 82 has connected one set of commonly bussed modulator electrodes 39 to an "ON" bias voltage, $V_1$, permitting the flow of electrons from the multiplier 37 to the screen. When the modulator control switch 82 receives the output from the comparator 72, the flip-flop 81 changes states and the "ON" bias voltage $V_1$ is switched from the bussed modulator electrodes 39, to a more negative voltage, $V_2$, causing electrons from the multiplier to be repelled before reaching the screen 12. Since both the address electrode 35 and the modulator electrode 39 must be properly biased in order for the electrons to flow to a given image element, the two electrode combination is analogous to an AND gate. The output of the comparator 72 also enters the anode reset switch 84, which connects an anode bias voltage $V_3$ to one set of bussed anode electrodes 42, removing the charge due to electron bombardment.

Therefore, when the proper incident charge on the anode electrode 42 has been reached, the electron flow from the electron multiplier is shut off by biasing the modulating electrode 39 with a repelling potential and the charge is removed from the anode electrode. When this same control circuit 70 is to control the display of another picture element, a second reset signal from the clock 92 is applied to the control circuit 70. This clock signal resets the modulator switch circuit 82 imposing the $V_1$ modulating potential on the set of bussed modulator electrodes 39 and permitting the flow of electrons from the electron multiplier to the screen. At the same time, the clock reset signal is applied to the anode reset circuit 84 removing the anode bias potential $V_3$ from the anode electrode, thus allowing a charge buildup due to the electron flow. Even though the anode electrode 42 has been disconnected from the $V_3$ bias voltage, it remains at that potential until electrons strike the electrode, at which point the potential of the anode electrode decreases from the $V_3$ potential.

The description shall now focus on the control of all the image elements. Although a separate control circuit 70 could be used for each electron multiplier 37 in a single display line, the required number of circuits might be impractical; particularly if the display is to be used for television where the number of elements and control circuits for a single display line can approach 2,000. Therefore, some system of multiplexing must be incorporated in any display device in order for it to be practical. The multiplexing scheme shown in the present invention, FIG. 5, employs five individual control circuits 70 for an unlimited number of picture elements. Each control circuit extends between one of the five anode terminals 46 and the corresponding modulator electrode terminal 56. The anode electrodes and the modulator electrodes are bussed so that the first, sixth, eleventh, etc. electrodes are connected to the same control circuit 70; while the second, seventh, twelfth, etc. are connected to a separate control circuit; and so on, so that five control circuits are utilized. The first five address electrodes 35 are connected in common, the second set of five address electrodes are connected in common and so on through the entire array of address electrodes. As noted previously, the address and modulator electrodes 35 and 39 are multiplexed so that no group of address electrodes has more than one electrode associated with an electrode in each group of modulator electrodes. Therefore, when an "ON" bias potential is applied to a specific address bus and a specific modulator bus, electrons will flow to only one element along a given display line.

Figure 7:
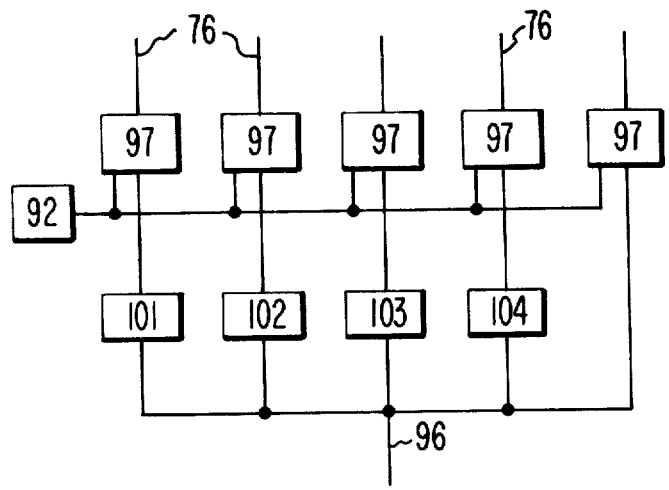
FIG. 7 is another portion of the control circuitry.

In the present embodiment with five adjacent address electrodes bussed together, five adjacent elements can be displayed simultaneously on the screen. Therefore, in order to compare the five brightness signals for each of the five elements, a delay circuit similar to that in FIG. 7 must be employed. The time sequential image brightness signal for all of the elements is fed to input line 96. This brightness signal is a sequential composite of the brightness signal for each element of the display, as in conventional television systems. First, the brightness signal for the first element in a display line is transmitted on the input line 96, then, the signal for the second element and so on for all of the line elements. Delay lines 101-104 are employed to delay each element's brightness signal for the proper amount of time so that it can be simultaneously fed to the input 76 of each of the control circuits 70. Specifically, the first delay line 101 delays the signal for four image element time units, the second delay line 102 delays the second element signal for three time units. The third and fourth delay lines 103 and 104 retain their particular signals for two and one time units respectively. The fifth line has no delay circuit on it. The output from each delay line and the fifth line are connected to a different sample and hold circuit 97.

Due to these delay lines 101-104 when the image brightness signal for the fifth element is on the input line 96, the output of each of the first, second, third and fourth delay lines 101-104 is the specific brightness signal for the first, second, third and fourth elements respectively. Therefore, at that given instant, the proper brightness signal for each of the five elements is being fed into a sample and hold circuit 97 for each element control circuit 70. Each sample and hold circuit 97 then is triggered simultaneously by a signal from the clock 92 to store the brightness signal for its respective picture element. This stored signal is then fed to the corresponding modulation control circuit 70.

In this way, a time-sequential brightness signal is processed to simultaneously control the five picture elements so that they may be displayed at the same instant of time. When all five signals are fed to the respective control circuit 70, the corresponding five address electrodes 35 are biased "ON" by clock 92 and drive circuits (not shown) so that electrons may flow through the multiplier to the bussed anode electrodes 46. The multiplexing of the control circuits is made possible by using both the address and the modulator electrodes as an AND gate to activate a specific image element. With the multiplexing, when the next set of five picture elements is to be addressed each of the control circuits 70 and the sample and hold circuits 97 are reset by the clock 92 so that the next set of five brightness signals can be processed. The resetting by the clock 92 also switches to the next set of five address electrodes 35 by applying a bias voltage to the respective terminal 57. The display process is then repeated for this set of image elements, then the next set is addressed and so on. After all of the elements along one line have been addressed, the next cathode stripe 24 is activated to scan the elements in the next line. Since the electron multiplier, modulator and acceleration electrodes extend the full height of the display, these same electrodes are used to scan every line of the display.

As noted previously, the specific number of control circuits 70 may be varied by variations in the multiplexing. However, there is a continuum of possibilities from one extreme where separate control circuits are used for each picture element to the opposite extreme of one control circuit for all the line elements. In the first extreme, the number and thus the cost of the circuits is quite high whereas in the second extreme the sophistication of the control circuitry is very great because of the rapid switching time that a single circuit must have in order to control all of the elements of this display. In addition, the modulation dwell time, or the time during which each element is modulated, increases with an increase in the number of control circuits 70. More control circuits 70 result in each circuit controlling fewer elements and therefore each circuit can control a given element for a longer period of time. The embodiment described herein was chosen for the ease with which it can be described and drawn. This embodiment may not necessarily be the preferred embodiment for all displays depending on the number of elements in each display line.

Figure 8:
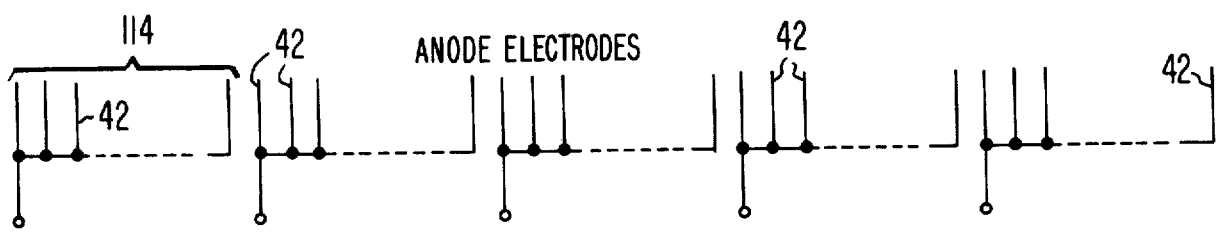
FIG. 8 is an alternate multiplexing system.
Figure 8:
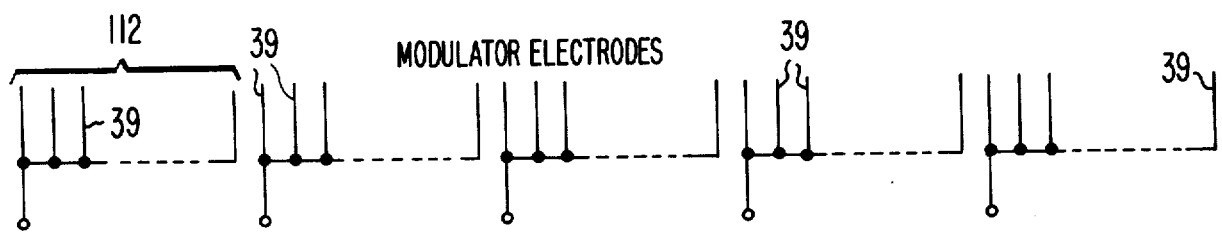
Figure 8:
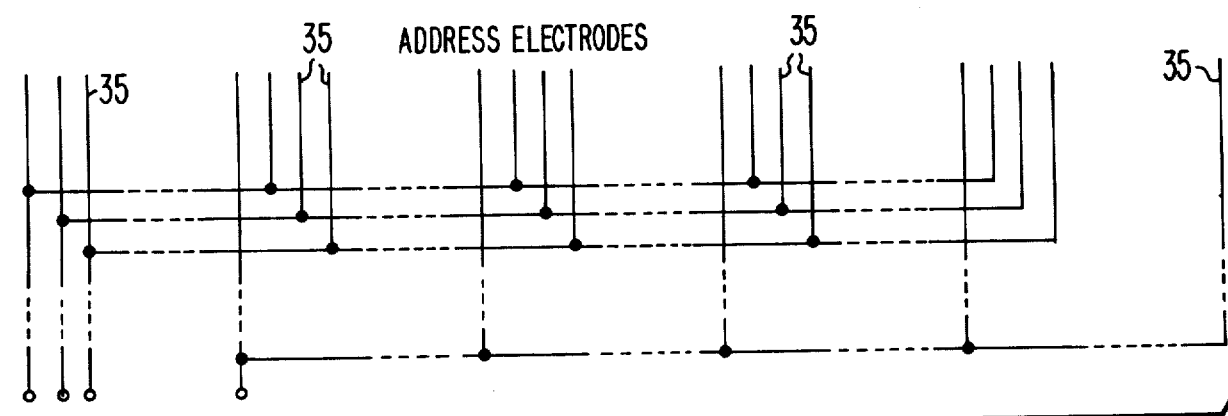

Other variations of the multiplexing concept are possible, as shown in FIG. 8. In this embodiment, Y adjacent anode electrodes 114 and Y adjacent modulator electrodes 112 are bussed in common. Groups of X address electrodes 35 are sequentially bussed so that every Yth electrode is connected in common. Each set of Y anode and each set of Y modulator electrodes are connected to a separate control circuit 70. When the image is displayed, every Yth element is simultaneously displayed, then the next group of every Yth elements is displayed and so on. This embodiment has the advantage of decreasing the anode electrode capacitance over the first embodiment which has interdigitated anode electrode busing. The decreased capacitance increases the sensed voltage at the anode for a constant X, i.e., for a constant number of modulation control circuits 70. However, more complex image brightness delay circuitry is required for the second multiplexing scheme.

Still other variations in the multiplexing concept might include eliminating the address electrodes at the multiplier input and inserting a second set of modulator electrodes adjacent to the first set. In this variation the two modulator electrodes could be multiplexed as the address and modulator electrodes are in FIGS. 5 and 8 to form the AND gate multiplexing. The use of address electrodes, however, saves power since the electron multiplication occurs only when an element is addressed.

A further variation is the use of more than two sets of electrodes for each element address and modulation. This concept increases the number of inputs to the AND gate while decreasing further the number of control circuits.

I claim:

1. A system for modulating a display device having a cathodoluminescent screen comprising:
   means for sensing an electrical charge on the screen; and
   means for regulating the flow of electrons to the screen in response to the sensed charge.

2. The system in claim 1 wherein the means for sensing the electrical charge comprises at least one anode electrode on the inner surface of the screen.

3. The system as in claim 2 wherein the means for regulating the electron flow comprises:
   a comparator for comparing the voltage between the anode electrode and a reference point to the voltage of an image brightness signal;
   an electron shutter through which the electrons flow to the screen; and
   means for opening and closing the electron shutter in response to the comparison of the anode electrode voltage and the brightness signal voltage.

4. The system as in claim 3 wherein the electron shutter comprises a modulation electrode and the means for opening and closing the shutter comprises a switchable voltage source for biasing the modulation electrode.

5. The system as in claim 2 further comprising means for removing the charge on the anode electrode.

6. The system as in claim 2 wherein the means for regulating the electron flow comprises:
   a modulation electrode within the image display device;
   a voltage comparator having one input connected to the anode electrode and another input connected to an image brightness signal;
   a modulator switch having one switch terminal connected to the modulator electrode and another switch terminal connected to a bias voltage, the modulator switch also having a control input connected to the output from the voltage comparator;
   an anode electrode switch having one switch terminal connected to the anode electrode and another switch terminal connected to a bias voltage, the control input of the anode electrode switch being connected to the voltage comparator output, and
   a clock having its output connected to the reset inputs of both the anode electrode and modulator switches.

7. An image display device having an envelope with a cathodoluminescent screen comprising:
   a plurality of electron multipliers within the envelope to establish a flow of electrons to the screen for the bombardment of a number of elements in a line of the image display;
   a plurality of M first electrodes for addressing specific elements in the line, X first electrodes being connected in common to form Y groups of first electrodes wherein M equals X times Y;
   a plurality of M second electrodes for modulating the electron flow to the screen, each of the second electrodes being associated with one of the first electrodes, Y second electrodes being connected in common to form X groups of second electrodes so that no group of first electrodes has more than one electrode associated with an electrode in each group of second electrodes and;
   a plurality of M anodes on the screen, Y anode electrodes being connected in common to form X groups of anode electrodes.

8. The device as in claim 7 wherein the X first electrodes are adjacent to one another and the Y second electrodes are sequentially connected so that every Xth second electrode is in common.

9. The device as in claim 8 further comprising a plurality of M anode electrodes sequentially connected in groups so that every Xth anode electrode is in common.

10. The device as in claim 9 further comprising X control circuits each controlling a bias voltage for one group of Y second electrodes in response to the electrical charge on one group of connected anode electrodes.

11. The device as in claim 10 wherein each control circuit compares the charge on the anode electrodes to an image brightness signal and wherein some of the control circuits include means for delaying the image brightness signal.

12. The device as in claim 7 wherein the X first electrodes are sequentially connected so that every Yth first electrode is connected in common and Y adjacent second electrodes being connected in common to form X groups.

13. The device as in claim 12 further comprising a plurality of M anode electrodes connected into X groups of Y adjacent anode electrodes.

14. The device as in claim 13 further comprising X control circuits each controlling a bias voltage for one group of Y adjacent second electrodes in response to the electrical charge on one group of connected anode electrodes.

15. The device as in claim 14 wherein each control circuit compares the charge on the anode electrodes to an image brightness signal and wherein some of the control circuits include means for delaying the image brightness signal.

16. A method for modulating an image display device to control the image brightness, the display having a cathodoluminescent screen upon which an image is displayed, the method comprising:
   regulating the flow of electrons to the screen by sensing the electrical charge incident on the screen.

17. The method as in claim 16 wherein the regulating comprises the steps of:
   sensing the electrical charge on the screen;
   converting the sensed charge to a proportional voltage; and
   stopping the flow of the electrons to the screen when the proportional voltage has reached a predetermined level.

18. The method as in claim 16 wherein the regulation comprises the steps of:
   sensing an electrical charge on the screen;
   converting the sensed charge to a proportional voltage;
   comparing the proportional voltage to the voltage of an image brightness signal; and
   stopping the flow of electrons to the screen when the proportional voltage has reached a predetermined value with respect to the image brightness signal.

19. A method for modulating an image display device to control the image brightness, the device having a cathodoluminescent screen upon which an image is displayed, said method comprising regulating the flow of electrons by sensing the electrical potential between the screen and a reference point.

20. The method as in claim 19 wherein the regulating comprises stopping the flow of electrons to the screen when the sensed potential reaches a predetermined level.

21. The method as in claim 19 wherein the regulating comprises:
   comparing the sensed potential to the electrical potential of an image brightness signal; and
   stopping the flow of electrons to the screen when the sensed potential reaches the predetermined value with respect to the brightness signal potential.

* * * * *